United States Patent [19]

Hirose et al.

[11] 4,417,186

[45] Nov. 22, 1983

[54] COMMUTATORLESS ELECTRICAL MOTOR HAVING SUB MAGNETIC POLES

[75] Inventors: Yukimi Hirose, Atsugi; Ken Enami, Kawasaki; Kinzo Wada, Yokohama, all of Japan

[73] Assignee: Victor Company of Japan, Limited, Yokohama, Japan

[21] Appl. No.: 338,997

[22] Filed: Jan. 12, 1982

[30] Foreign Application Priority Data

Jan. 13, 1981 [JP] Japan ................................ 56-2415[U]

[51] Int. Cl.³ ............................................ H02K 29/02
[52] U.S. Cl. .................................... 318/254; 318/138; 310/156
[58] Field of Search .................... 318/254 A, 254, 138; 310/DIG. 3, 156

[56] References Cited

U.S. PATENT DOCUMENTS 3,883,633 5/1975 Kohler .................................. 318/254
4,086,519 4/1978 Persson ............................ 318/254 A
4,302,692 11/1981 Matsumoto et al. ................. 310/156

Primary Examiner—David Smith, Jr.
Attorney, Agent, or Firm—Lowe, King, Price & Becker

[57] ABSTRACT

A commutatorless electrical motor comprises a cylindrical magnetic rotor having main magnetic poles where N and S poles are alternately arranged in the circumferential direction, and an axis of N and S poles of each magnet extends radially, and a sub magnetic poles at one end of the cylindrical rotor. The sub magnetic poles are arranged such that N and S poles of each magnetized area extends axially. The magnetized area providing each sub magnetic pole has an arcuate extent of $\pi/2$ or less in an electrical angle. Each of the magnetized area providing each sub magnetic pole makes a given change in the magnetic flux density distribution in the vicinity of rotational position detecting elements so that the rotational position of the rotor can be accurately detected. As a result, current switching circuit for changing over armature currents will be controlled by the accurate information from the detecting elements, and thus each armature winding will be energized in a desirable manner, reducing undesirable torque ripple.

5 Claims, 13 Drawing Figures

COMMUTATORLESS ELECTRICAL MOTOR HAVING SUB MAGNETIC POLES

BACKGROUND OF THE INVENTION

This invention relates generally to commutatorless electrical motors, and more particularly, the present invention relates to structure of a magnetic rotor of such a motor having rotational position detecting elements.

In conventional commutatorless electrical motors, Hall generators are provided for detecting the position of the rotor so that currents respectively flowing through armature windings disposed on the stator are changed over. The output voltages from the Hall generators are fed to a switching circuit in which energization of the armature windings is effected in a sequence. However, the voltages from the Hall generators are not uniform and therefore, it is difficult to provide accurate switching timing. Furthermore, since the output voltage from Hall generators is relatively low because the magnetic flux density around the end of cylindrical magnetic rotor is lower than that in the vicinity of the inner surface of the cylinder. Low voltages from Hall generators result in slow switching of the armature currents, and thus armature winding current flowing angle corresponding to energization time length is apt to be widened, deteriorating the efficiency of the electrical motor. Namely, in conventional commutatorless electrical motors, torque ripple, i.e. variation in rotational torque, occurs due to error in rotational position detection. In order to compensate for the above defects of commutatorless electrical motors having Hall generators as rotational position detecting elements, input currents of the Hall generators have been increased in some conventional motors. However, such a conventional commutatorless electrical motors have suffered from a problem that current consumed by the Hall generator is very large.

SUMMARY OF THE INVENTION

This invention has been developed in order to remove the above-described drawbacks and disadvantages inherent to the conventional commutatorless electrical motors.

It is, therefore, an object of the present invention to provide a new and useful commutatorless electrical motor in which torque ripple due to error in rotational position detection has been improved, while current consumed by rotational position detecting elements is small.

In accordance with the present invention there is provided a commutatorless electrical motor comprising: a stator provided with polyphase armature windings; a cylindrical rotor having main magnetic poles including rotation driving magnets which have been formed by magnetization in such a manner that N and S poles are alternately arranged in the circumferential direction, and an axis passing through the N and S poles of each magnet extends radially; a plurality of sub magnetic poles which have been formed on one end of said rotor by magnetization in such a manner that an axis passing through N and S poles thereof extends axially and that the magnetized area angle thereof with respect to the center axis of said rotor is much smaller than that of the main magnetic poles and is smaller than at least $\pi/2$ radian in an electrical angle; a plurality of rotational position detecting elements provided for detecting the position of said sub magnetic poles of said rotor; and current switching means for changing over the currents flowing through said polyphase armature windings in accordance with signals from said plurality of rotational position detecting elements.

BRIEF DESCRIPTION OF THE DRAWINGS

The object and features of the present invention will become more readily apparent from the following detailed description of the preferred embodiment taken in conjunction with the accompanying drawings in which.

The same or corresponding elements and parts are designated at like numerals throughout the drawings.

DETAILED DESCRIPTION OF THE INVENTION

Prior to describing the preferred embodiments of the present invention, the aforementioned conventional commutatorless electrical motor will be described for better understanding of the present invention.

Figure 1:
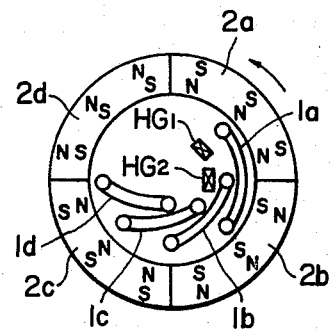
FIG. 1 is a schematic view of a conventional example of a commutatorless electrical motor which is viewed from one side of the rotary shaft thereof.

FIG. 1 is a schematic view of a conventional example of a commutatorless electrical motor viewed from one side of the rotary shaft thereof. The references $1a$, $1b$, $1c$ and $1d$ are four-phase armature windings constituting a stator, where respective windings are spaced from each other by $\pi/2$ in terms of an electrical angle. The references 2a, 2b, 2c and 2d are four-pole main magnetic poles comprising rotation driving magnets which constitute a rotor where N and S poles of the magnets are alternately arranged in the circumferential direction and an axis passing through the N and S poles of each magnet extends in the direction of the radius of the rotor. The references HG1 and HG2 are Hall generators which function as rotational position detecting elements which detect the rotational position of four-pole magnets constituting the above-mentioned rotor, where the Hall generators are spaced by $\pi 2$ in terms of an electrical angle.

Figure 2:
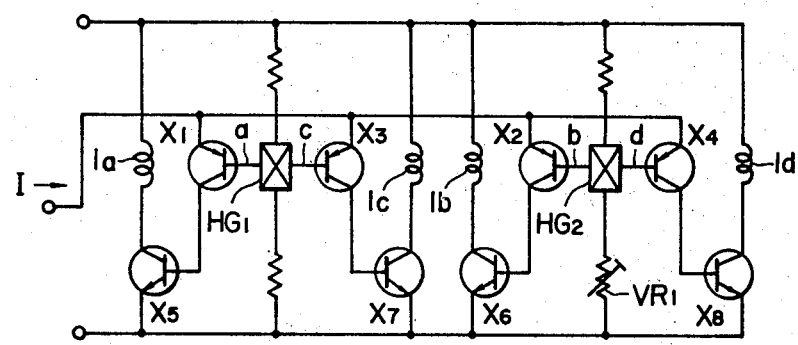
FIG. 2 is a diagram of a circuit for switching the armature currents of the commutatorless electrical motor of FIG. 1.

FIG. 2 is a circuit diagram of a current switching circuit for changing over the currents flowing through the armature windings of the commutatorless electrical motor of this sort. Although it will be described that the switching circuit of FIG. 2 operates together with the conventional motor of FIG. 1, this switching circuit may also be used for the motor according to the present invention as will be described later. Transistors X1, X2, X3 and X4 are of common emitter, and the bases thereof are respectively connected to the output terminals "a," "b," "c" and "d" of the Hall generators HG1 and HG2 so that these four transistors X1, X2, X3 and X4 constitute a four-input differential amplifier. The reference VR1 is a variable resistor for equalizing the D.C. potentials at the output terminals of the Hall generators HG1 and HG2, and it is arranged such that the D.C. potentials at the output terminals thereof are equal to each other when the Hall generators HG1 and HG2 are located in a nonmagnetic field.

Figure 3A:
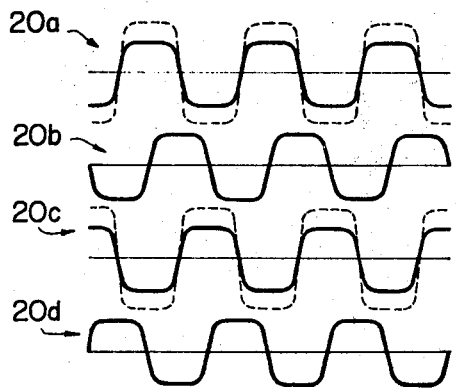
FIG. 3A is a waveform chart showing the output voltages from the Hall generators of FIG. 2.

The Hall generators HG1 and HG2 develop at their output voltage terminals a, b, c and d output voltages in receipt of magnetic flux from the magnetic poles 2a, 2b, 2c and 2d constituting the rotor. FIG. 3A show the waveforms of output voltages at the output terminals "a," "b," "c" and "d" of the Hall generators HG1 and HG2.

Figure 3B:
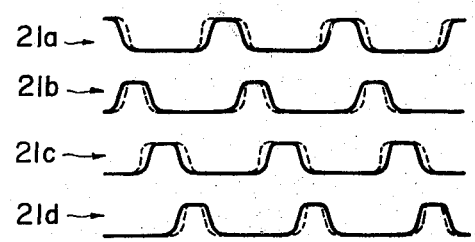
FIG. 3B is a waveform chart showing electrical currents flowing through the armature windings of FIG. 2.

At the output terminals "a," "b," "c" and "d" of the above-mentioned Hall generators HG1 and HG2 are developed voltages which vary in accordance with the rotation of the magnets constituting the rotor. The emitter-collector path of one of the transistors X1, X2, X3 and X4, corresponding to the lowest voltage among the voltages at the terminals a, b, c and d, becomes conductive, while remaining transistors become nonconductive. A control current I supplied from the common emitters of the transistors X1, X2, X3 and X4 flows via the collector of the conductive transistor into the base of a corresponding transistor among transistors X5, X6, X7 and X8 so that a current which is $h_{FE}$ times the base current of the transistor, flows into a corresponding armature winding among the armature windings 1a, 1b, 1c and 1d, a magnetic field produced thereby acts on the magnetic field of magnets, which constitute the rotor, to cause the rotor to generate rotational torque. After this, since the output voltages developed at the output terminals "a," "b," "c" and "d" of the Hall generators HG1 and HG2 vary as curves 20a, 20b, 20c and 20d of FIG. 3A because of the rotation of the rotor, i.e. the magnets, currents are changed over in a sequence of the armature windings 1a, 1b, 1c and 1d, as shown in curves 21a, 21b, 21c and 21d of FIG. 3B, and thus continuous rotational torque occurs in the rotor.

It is necessary that the magnetic flux from the magnets constituting the rotor is of high intensity in order to better the efficiency of the conventional customary commutatorless electrical motor which operates in the above-described manner.

This magnetic flux $\Phi g$ is expressed by:

$$\Phi g = Bg\,A$$

wherein
Bg is magnetic flux density of the magnets of the rotor; and
A is effective area:

Namely, magnetic flux $\Phi g$ is proportional to the effective area, and therefore, rectangular magnetization is effective for raising the efficiency of electrical motors.

In conventional commutatorless electrical motors, a cylindrical permanent magnet is formed by magnetization so that N and S poles are arranged alternately at its inside in the circumferential direction for providing a rectangular wave like magnetic flux distribution, and therefore, the flowing angle, which corresponds to energizing time length, of the current flowing through each of the armature windings is determined by using the voltage difference between the output voltages from the Hall generators.

Figure 4:
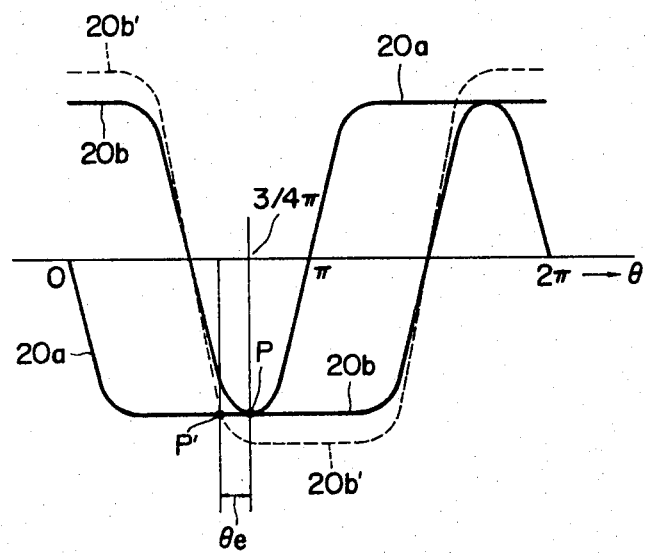
FIG. 4 is an explanatory diagram in the case that the output voltage of one Hall generator in the conventional example has become greater than the output voltage of the other Hall generator.

FIG. 4 is a waveform chart showing output voltages at the output terminals "a" and "b" of the Hall generators HG1 and HG2, where the output voltages are designated at 20a and 20b respectively. A point P is an intersection between the output voltage waveforms 20a and 20b, and indicates a switching point or instance of the currents flowing through the armature windings 1a and 1b. As shown in this diagram, since the Hall generators HG1 and HG2 produce output voltages in receipt of magnetic flux from magnetic poles which have been formed by magnetization so that the magnetic flux distribution is of a rectangular wave at the inside of the above-mentioned cylindrical rotor, the output voltage waveform of each of the Hall generators HG1 and HG2 also assumes a rectangular wave. Therefore, the slope of the output voltage waveform is small in the vicinity of the intersection of the output voltage waveforms, and thus, the flowing angle of the current through the armature windings is apt to have an error, resulting in the occurrence of torque ripple or variation in torque in the rotor due to the difference between the output voltages been the two Hall generators HG1 and HG2, the error in the mechanical installing position of the Hall generators, and error voltages at the voltage comparison portion responsive to the output voltages from the Hall generators HG1 and HG2.

A waveform 20b' shown by a broken line in FIG. 4 shows a state that the output voltage at the output terminal "b" of the Hall generator HG2 is greater than the output voltage at the output terminal "a" of the Hall generator HG1, and in this case, the switching point of the current flowing through the armature windings is deviated from P to P' by $\theta e$.

The output voltage of each of the Hall generators HG1 and HG2, which is referred to as Hall voltage, is given by the following formula:

$$VH = KH \cdot Bg \cdot IH$$

wherein
VH—Hall voltage
KH—Hall constant
Bg—flux density
IH—input current

Namely, the Hall voltage is proportional to the density Bg of magnetic flux crossing the Hall generator HG1 or HG2 and to its input current IH.

Figure 5:
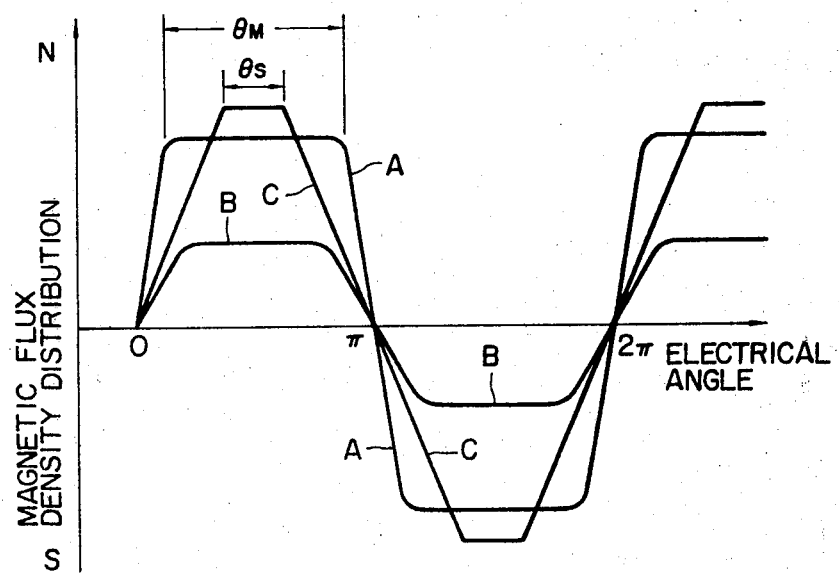
FIG. 5 is a diagram for showing the difference between the magnetic flux density in the vicinity of the main magnetic poles of the rotor and the magnetic flux density in the vicinity of the end surface of the rotor magnets in the conventional example and in the present invention.

FIG. 5 shows magnetic flux distribution of the magnets which constitute the rotor, and magnetic flux distribution at the surface of the Hall generator HG1 or HG2 which receives this magnetic flux, and the reference A is the flux density in the vicinity of the inner surface of the magnets which constitute the cylindrical rotor; and B, the flux density in the vicinity of the end of the permanent magnets at which end the Hall generators are located. As will be understood from this diagram, the magnetic flux density in the vicinity of the end surface of the magnets where the Hall generators HG1 and HG2 are located, is smaller than that in the vicinity of the inner surface of the magnets which constitute the rotor. Accordingly, in the conventional electrical motors, the output voltages of the Hall generators HG1 and HG2 are apt to low. And in the case that the armature current switching circuit of the four-input differential type as shown in FIG. 2 is used, since the voltage difference between base voltages of the transistors X1, X2, X3 and X4 is small due to the low output voltages from the Hall generators HG1 and HG2, changeover of the armature currents becomes slow, widening the flowing angle, and this may result in deterioration in efficiency and deviation in the switching point of the armature currents.

Therefore, in the conventional example, the input currents of the Hall generators HG1 and HG2 are increased and corrected so that the output voltages of the Hall generators HG1 and HG2 do not lower. However, there have been problems such that there is a limit in the maximum input current of the Hall generators HG1 and HG2, and the currents consumed by the Hall generators HG1 and HG2 increase.

This invention contemplates to remove the above-described conventional problems, and will be described with reference to an embodiment.

Figure 6:
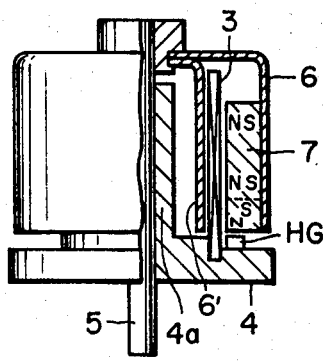
FIG. 6 is a partial cross-sectional side view of an embodiment of the commutatorless electrical motor according to the present invention.
Figure 7A:
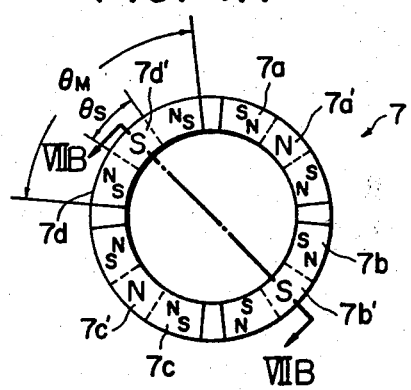
FIG. 7A is a top plan view of the rotor magnets constituting the rotor of FIG. 6.
Figure 7B:
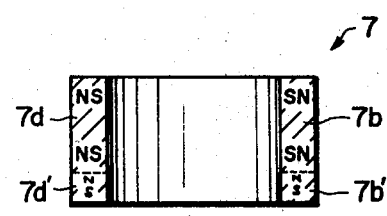
FIG. 7B is a cross-sectional side view of the rotor magnets constituting the rotor of FIGS. 6 and 7A taken along the line VIIB—VIIB.

FIG. 6 is a diagram showing the structure of the commutatorless electrical motor according to the present invention, FIGS. 7A and 7B are a top plan view and a cross-sectional side view of magnets which constitute a cylindrical rotor of FIG. 6, where the pith of the present invention resides in the structure of the rotor.

In these diagrams, the reference numeral 3 is a stator equipped with polyphase armature windings, and this stator 3 is fixed to a stator yoke 4 having a bearing portion 4a of a rotary shaft at its center. The reference numeral 5 is a rotary shaft rotatably pivotally connected to the above-mentioned bearing portion 4a; to this rotary shaft 5 is fixed a top of a rotor outer yoke 6 having a reversed cup-like shape, and at the inner surface of the rotor outer yoke 6 is fixed a rotor 7 made of cylindrical magnets with a given gap between the inner surface thereof and the outer surface of the above-mentioned stator 3. The reference numeral 6' is a rotor inner yoke having a shape of a reversed cup, and the top of the rotor inner yoke 6' is fixed to the rotary shaft 5 with a given gap beween the outer surface thereof and the inner surface of the above-mentioned stator 3.

The rotor 7 made of cylindrical permanent magnets is formed by magnetization in such a manner that N and S poles are arranged alternately in the circumferential direction while an axis passing through N and S poles of each of main magnetic poles 7a, 7b, 7c and 7d for rotation driving extends radially from the center axis of the cylindrical rotor 7. This arrangement of the magnets is the same as that of the above-described conventional motor, and the rotor 7 used in the present invention differs from the conventional one in that a plurality of sub magnetic poles 7a', 7b', 7c' and 7d' are additionally provided. These sub magnetic poles 7a',7b', 7c' and 7d' are provided at one end of the rotor 7 (see lower end of the rotor 7 in FIGS. 6 and 7B) by partially magnetizing the rotor 7 which has been alreadly magnetized in advance to provide the main magnetic poles 7a, 7b, 7c and 7d. Each of the sub magnetic poles 7a',7b',7c' and 7d' is arranged such that an axis passing through N and S poles of each magnetized area extends axially (namely, in parallel to the center axis of the rotor 7), and the magnetized area angle corresponding to an arcuate extent of each of the magnetized areas is much smaller than the magnetized area angle of the above-mentioned main poles 7a, 7b, 7c and 7d. This magnetized area angle is selected to a value which is approximately between $\pi/2$ and $\pi/8$ (radian) in an electrical angle. The number of the above-mentioned main magnetic poles 7a, 7b, 7c and 7d is identical with that of the sub magnetic poles 7a', 7b', 7c' and 7d'. As seen in FIG. 7A, each of the sub magnetic poles 7a', 7b', 7c' and 7d' is located at the middle of one end of each of the main magnetic poles 7a, 7b, 7c and 7d.

In FIG. 7A, $\theta m$ is the magnetized area angle of the above-mentioned main magnetic poles 7a, 7b, 7c and 7d, and $\theta S$, the magnetized area angle of the above-mentioned sub magnetic poles.

Figure 8:
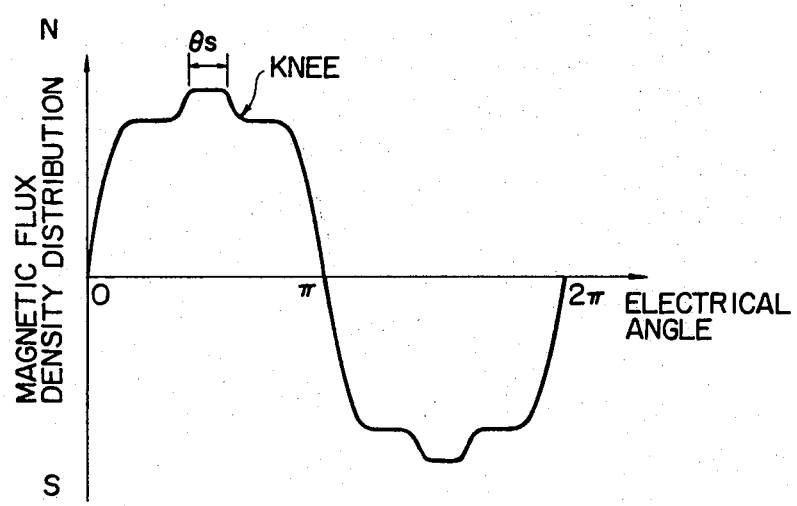
FIG. 8 is a diagram showing magnetic flux density distribution in the vicinity of one end surface of the cylindrical rotor having sub magnetic poles whose magnetized area angle is smaller than $\pi/8$ (radian) in electrical angle.

The magnetized area angle S of the above-mentioned sub magnetic poles 7a', 7b', 7c', and 7d' has to be less than $\pi/2$ (radian) because improvement in torque ripple would be small if the magnetized area angle $\theta S$ is greater than $\pi/2$ in an electrical angle. However, if the magnetized area angle is made smaller than $\pi/8$ (radian), a problem would occur because the magnetic flux distribution at the end of the cylindrical rotor 7 is distorted as shown in FIG. 8.

Even if the magnetized area angle is less than $\pi/8$ (radian), the magnetic flux density distribution at the ends of the rotor magnets becomes close to trapezoidal magnetic flux density distribution as shown by the curve C in FIG. 5 if magnetization force is increased. However, rotational torque would decrease since the magnetic flux density of the main magnetic poles 7a to 7d for rotation driving decreases.

According to experiments, when the magnetization of the above-mentioned sub magnetic poles 7a' to 7d' is effected where the magnetized area angle is between $\pi/2$ and $\pi/8$ in an electrical angle, a satisfactory magnetic flux distribution has resulted without lowering torque.

Furthermore, the magnetic flux density distribution in the vicinity of the ends of the permanent magnets with the above-mentioned sub magnetic poles 7a' to 7d' formed by magnetization, is shown by the curve C of FIG. 5. Comparing this magnetic flux density distribution (curve C) with the magnetic flux density distribution (curve B) in the conventional example, the maximum magnetic flux density of the former is greater than the double of the latter, and assumes a trapezoidal shape.

Figure 9:
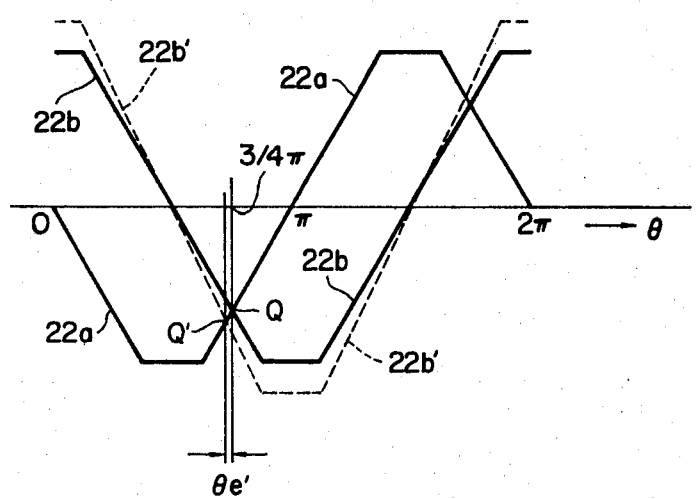
FIG. 9 is an explanatory diagram in the case that the output voltage of one Hall generator of the present invention has become greater than the output voltage of the other Hall generator.

FIG. 9 is a waveform chart showing output voltages 22a and 22b at the output terminals "a" and "b" of the Hall generators HG1 and HG2 in the case that the rotor 7 having sub magnetic poles 7a' to 7d' as described in the above is used and an armature current switching circuit similar to that of FIG. 2 is used. In this case, if the output voltage at the output terminal "b" of the Hall generator HG2 becomes greater than the output voltage at the output terminal "a" of the other Hall generator HG1 as shown by the curve 22b', the armature current switching point is deviated from the point Q to the point Q' by θe'. However, this deviation is remarkably smaller than the deviation θe of the armature current switching point in the conventional example (see FIG. 4). Namely, improvement has been achieved.

Figure 10A:
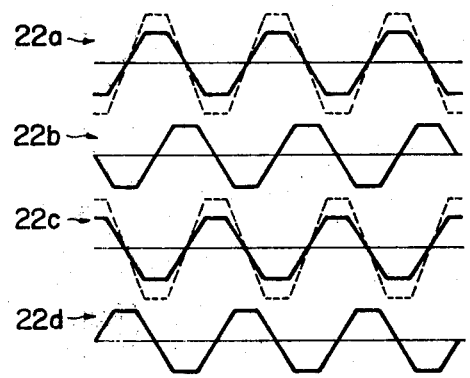
FIG. 10A is a waveform chart showing the output voltages from the Hall generators included in the commutatorless electrical motor of FIG. 6.
Figure 10B:
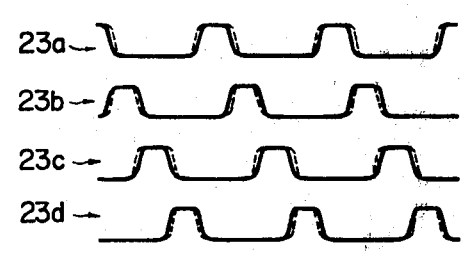
FIG. 10B is a waveform chart showing electrical currents flowing through the armature windings of the commutatorless electrical motor of FIG. 6.

The references 22a, 22b, 22c and 22d of FIG. 10A are waveforms of output voltages at the output terminals "a," "b," "c" and "d" of the Hall generators HG1 and HG2 connected to an armature current switching circuit such as that of FIG. 2, in a commutatorless electrical motor according to the present invention, and 23a, 23b, 23c and 23d in FIG. 10B are waveforms of the armature currents. In these waveform charts, broken lines indicate an output voltage waveform in the case that the output voltage of one Hall generator is greater than the other, and an armature current waveform whose flowing angle has been varied accordingly. In such a case, since the deviation of the current switching point of the armature current is small in the present invention as described with reference to FIG. 9, the variation in flowing angle of the armature currents in the present invention is smaller than that in the aforementioned conventional motor which suffers from variation in output voltages of the Hall generators HG1 and HG2. It will be understood, therefore, that torque ripple due to the variation in the flowing angle of the armature currents can be considerably improved.

In addition, variation in flowing angle of the armature current due to error in mechanical installing poision of the Hall generators HG1 and HG2 and error voltage (for instance, variation in $V_{BE}$ of the transistors X1 and X4 of FIG. 2) at the comparison portion of the output voltages from the Hall generators HG1 and HG2, can be improved.

Moreover, since the magnetic flux density at the end of the cylindrical rotor 7 can be increased to a value which is approximately twice the value in the conventional example because of the provision of the sub magnetic poles 7a' to 7d', input currents flowing into the Hall generators HG1 and HG2 can be reduced to half of the conventional one, and therefore, it is possible to reduce the current consumed.

Although the rotor 7 of the embodiment of the present invention may be manufactured such that the main magnetic poles 7a to 7d and the sub magnetic poles 7a' to 7d' are formed by magnetizing an isotropic ferrite magnet, an anisotropic ferrite magnet may be used so that two anisotropic axes respectively correspond to radially extending main magnetic poles and to axially extending sub magnetic poles.

In the embodiment of the present invention, although description has been made taking an example of a four-phase commutatorless electrical motor using Hall generators as rotor rotational position detecting elements, the same results as those described in the above will be expected in the case that magnetoresistance elements are used and also in the case of commutatorless electrical motors of other than four-phase.

From the foregoing it will be understood that according to the present invention the rotational position of the rotor can be accurately detected and thus, current switching circuit for changing over armature currents will be controlled by the accurate information from the detecting elements in such a manner that error in flowing angle of the armature currents due to error in rotational position detection is very small. Consequently, armature windings will be energized in a desirable manner, reducing undesirable torque ripple.

Furthermore, it is also possible to increase the signal output of the rotational position detecting elements, and to reduce the currents consumed by the rotational position detecting elements.

The above-described embodiments are just examples of the present invention, and therefore, it will be apparent for those skilled in the art that many modifications and variations may be made without departing from the spirit of the present invention.

What is claimed is:
1. A commutatorless electrical motor comprising:
   (a) a stator equipped with polyphase armature windings;
   (b) a cylindrical rotor having main magnetic poles including rotation driving magnets which have been formed by magnetization in such a manner that N and S poles are alternately arranged in the circumferential direction, and an axis passing through the N and S poles of each magnet extends radially;
   (c) a plurality of sub magnetic poles which have been formed on one end of said rotor by magnetization in such a manner that an axis passing through N and S poles thereof extends axially and that the magnetized area angle thereof with respect to the center axis of said rotor is much smaller than that of the main magnetic poles and is smaller than $\pi/2$ radian in an electrical angle;
   (d) a plurality of rotational position detecting elements provided for detecting the position of said sub magnetic poles of said rotor; and
   (e) current switching means for changing over the currents flowing through said polyphase armature windings in accordance with signals from said plurality of rotational position detecting elements.

2. A commutatorless electrical motor as claimed in claim 1, wherein said magnetized area angle is greater than $\pi/8$ radian in an electrical angle.

3. A commutatorless electrical motor as claimed in claim 1, wherein said rotational position detecting element comprises a Hall generator.

4. A commutatorless electrical motor as claimed in claim 1, wherein each of said sub magnetic poles is located at the middle of each of said main magnetic poles.

5. A commutatorless electrical motor as claimed in claim 1, wherein the number of said sub magnetic poles is equal to the number of said main magnetic poles.

* * * * *